United States Patent

Peyser et al.

[15] 3,641,992
[45] Feb. 15, 1972

[54] DOUBLE-BOILER HEATING CONTAINER

[72] Inventors: Harry A. Peyser, Olympia Fields; Diane J. Doyle, Western Springs, both of Ill.

[73] Assignee: Continental Can Company, Inc., New York, N.Y.

[22] Filed: Feb. 11, 1970

[21] Appl. No.: 10,341

[52] U.S. Cl. ..........................126/378, 220/44 A, 220/68, 220/13
[51] Int. Cl. ..........................................A47j 27/06
[58] Field of Search ..............126/378, 377, 369; 220/68, 220/24, 44 A, 13, 68, 9 B; 229/3.5 MF

[56] References Cited

UNITED STATES PATENTS

| | | | |
|---|---|---|---|
| 2,817,744 | 12/1957 | Free | 126/377 X |
| 2,776,787 | 1/1957 | Nicol | 220/24 X |
| 525,933 | 9/1894 | Wood | 126/377 |
| 2,979,224 | 4/1961 | Henchert | 229/3.5 MF |
| 3,082,906 | 3/1963 | Reed | 229/3.5 MF |

*Primary Examiner*—Frederick L. Matteson
*Assistant Examiner*—Robert A. Dua
*Attorney*—Diller, Brown, Ramik & Holt

[57] ABSTRACT

This disclosure relates to a container of the "double-boiler" type in which an edible product is packaged within an inner chamber and water is packaged within an outer chamber with the chambers at no time being in fluid communication. The container includes two lids, one of which closes the inner chamber and defines with the other a volume through which steam is permitted to pass through a venthole to atmosphere in a controlled manner whereby the edible product in the inner chamber is uniformly heated by conduction and/or convection.

9 Claims, 4 Drawing Figures

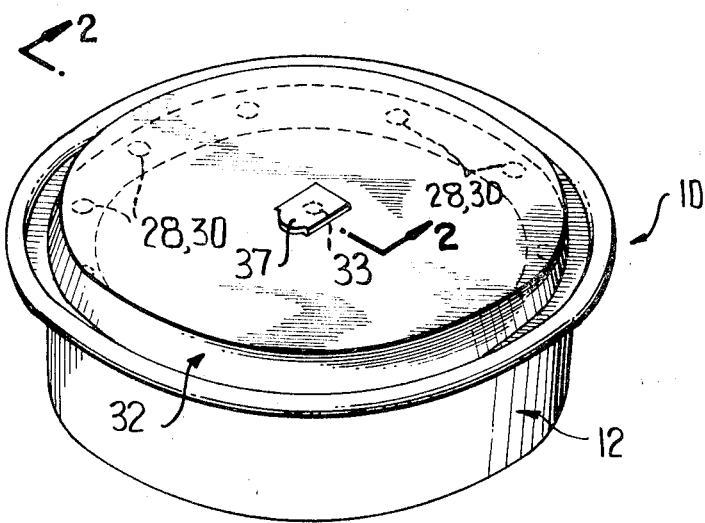
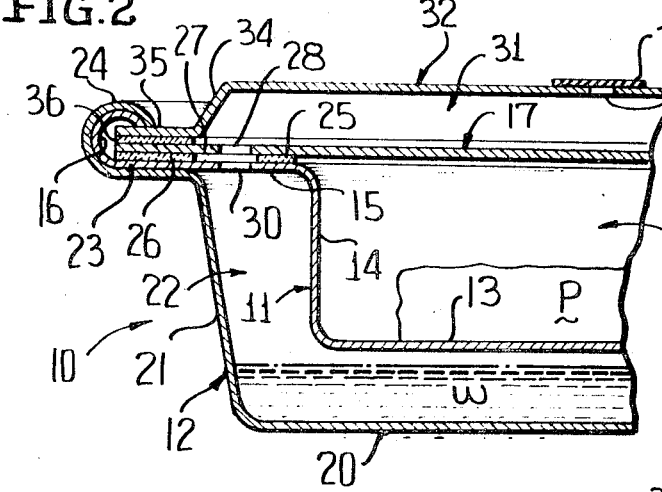
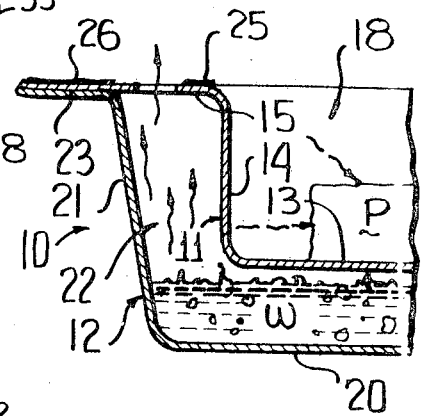
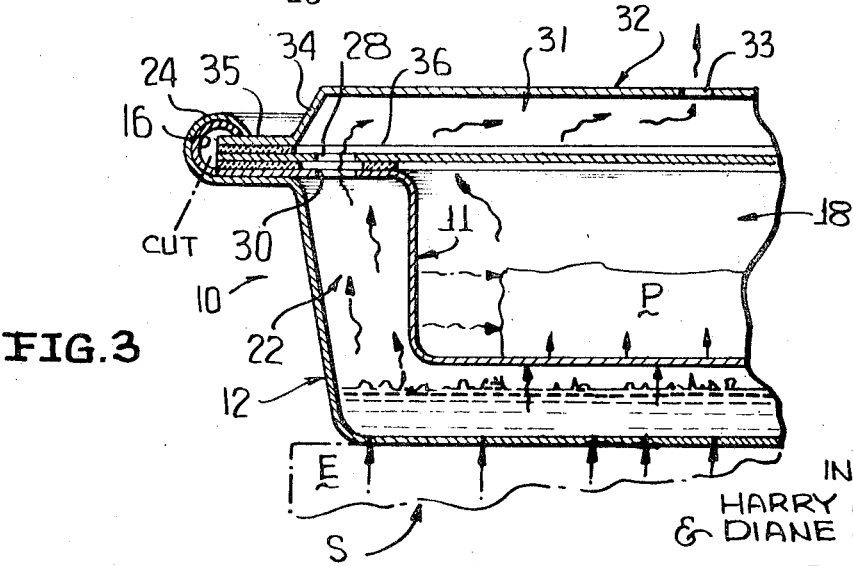

DOUBLE-BOILER HEATING CONTAINER

A primary object of this invention is to provide a novel food-processing container which functions are the well-known double-boiler principle and includes inner and outer nested container bodies each of which is defined by bottom and upstanding peripheral sidewalls in spaced relationship thereby forming a first chamber adapted to receive water or similar heat-transfer liquid, the inner container being closed by a lid and having an outwardly directed peripheral flange, the peripheral flange and lid being provided aligned vent openings to permit the escape of steam to an area above the lid, and a second lid defining a volume with the first lid into which the steam passes whereby the entire inner container is surrounded by steam thereby permitting the rapid heating of the product within the inner container without contamination thereof by the steam.

A further object of this invention is to provide a novel food-processing container of the type aforesaid wherein the outermost lid is provided with a centrally located vent opening to permit the steam to escape at a regular and consistent rate such that the edible product is processed in a desired time period.

With the above and other objects in view that will hereinafter appear, the nature of the invention will be more clearly understood by reference to the following detailed description, the appended claimed subject matter, and the several views illustrated in the accompanying drawing.

In the drawing:

FIG. 1 is a top perspective view of a novel heating container constructed in accordance with this invention and illustrates an outermost lid secured to an outer container by a curl.

FIG. 2 is a fragmentary enlarged sectional view taken generally along line 2—2 of FIG. 1, and illustrates a pair of aligned ventholes which place an outer chamber into fluid communication with a steam chamber between the cover and a lid of the inner compartment or chamber.

FIG. 3 is a fragmentary enlarged sectional view similar to FIG. 2, and illustrates the manner in which steam, represented by the unnumbered headed arrows, is generated from the liquid in the outer container or chamber and enters the steam chamber through the aligned ventholes.

FIG. 4 is a fragmentary enlarged sectional view similar to FIGS. 2 and 3, and illustrates the heating container after the lids have been removed to expose the product incident to serving.

A novel container of the double-boiler type is illustrated in the drawing, and is generally designated by the reference numeral 10. The container 10 includes an inner container body 11 (FIGS. 2 and 3) and an outer container body 12 in generally nested relationship. The inner container body 11 is defined by a bottom wall 13, an upstanding peripheral sidewall 14, a radially outwardly directed peripheral flange 15, and an upwardly inwardly and downwardly directed curl 16. The inner container body 11 and an associated closing means in the form of a lid 17 define a product chamber or compartment 18 in which is packaged an edible product P.

The outer container body 12 is likewise defined by a bottom wall 20 in spaced relationship to the bottom wall 13 of the inner container body 11 and an upstanding peripheral sidewall 21 in similar spaced relationship to the peripheral sidewall 14 of the inner container body 11 thereby defining a chamber 22 in which is packaged water W or similar heat-transfer liquid. The peripheral sidewall 21 of the outer container body 12 terminates in a radially outwardly directed peripheral flange 23 which includes an upwardly inwardly and downwardly directed curl 24 which is generally coextensive with the curl 16 of the inner container body 11, as is best illustrated in FIGS. 2 and 3 of the drawing.

Inner and outer annular bands of sealing compound 25, 26 are sandwiched between the peripheral flange 15 and an outermost peripheral portion (unnumbered) of the lid 17. Between the two bands 25, 26 of sealing compound is an annular space 27. Aligned apertures or holes 28, 30 are formed respectively in the lid 17 and the peripheral flange 15. A plurality of such pairs of ventholes 28, 30 are provided in the lid and peripheral flange 17, 15, respectively. The purpose of the ventholes 28, 30 is to permit steam within the outer chamber 22 to pass into a steam chamber generally designated by the reference numeral 31. The steam chamber 31 is defined between the lid 17 and another lid or closure 32 which contains but a single centrally located venting aperture 33 normally covered by a piece of pressure-adhesive tape 37 which is removed prior to heating the container 10. A peripheral portion (unnumbered) of the closure 32 is directed downwardly as at 34 and terminates in a radially outwardly directed peripheral flange 35 with an annular band of sealing compound 36 being disposed between the radially outwardly directed peripheral flange 35 and the peripheral portion (unnumbered) of the lid 17. The annular band of sealing compound 36 prevents steam from escaping the chamber 31 other than through the venthole 33. It is to be particularly noted that the lid 17 is completely imperforate and steam within the chamber 31 is thereby prevented from entering the inner chamber 18 and contaminating the product P.

The heating container 10 may be employed, for example, in aircraft to feed passengers and/or the flightcrew and is prepackaged to include the edible product P and the water W, the latter of which may be spaced from the bottom wall 13 or may contact the same as well as a portion of the peripheral sidewall 14. The container 10 is positioned atop a heating element E of a stove top S and steam is soon emitted from the eventually boiling water W. The steam flows upwardly between the sidewalls 14, 21 in the manner indicated by the unnumbered headed arrows in FIG. 3 and passes through the registered ventholes 28, 30 into the steam chamber 31 and outwardly therefrom at a controlled rate through the small venthole 33. The venthole 33 thus prevents the lid 32 from "blowing" off and more importantly serves to regulate the temperature within the chambers 22, 31 to achieve a rapid heating of the product P.

As an example of the operability of the container 10, a 16-ounce frozen product at 0° F. can be brought to 140° F. in 15 to 20 minutes. In the absence of the lid 32 and vents corresponding to the vents 28, 30, the same 16-ounce product starting at 0° F. was heated to a temperature of only 87° F. after 39 minutes of heating and the same product was still frozen. Furthermore, as heretofore emphasized the product P is heated without contamination by the steam.

After the container 10 has been heated to the desired temperature, the covers or lids 17, 32 are removed in any suitable manner desired, and the container is then readily adapted for serving in the manner shown in FIG. 4. Depending upon the product P, it is to be further understood that the lid 32 can be removed prior to the lid 17 at which time the hot water may be dumped outwardly from the chamber 22 through the vent openings 28, 30, although this is for the most part unnecessary since the water serves to maintain the product P for considerable time at elevated temperature while being eaten.

Though the particular materials from which the heating container are constructed have not been specifically set forth heretofore, the outer container body 12 is preferably constructed from steel or steel foil, while the inner body 11 may be constructed from steel, aluminum, plastic, or laminates of these materials. The lids may similarly be constructed of such material, and in general the only criteria is that the materials of these components are relatively impermeable to liquid and gases. The lids 17, 32 must be constructed from material which is readily torn or can be removed to gain access to the product P within the inner container 11.

While preferred forms and arrangements of parts have been shown in illustrating the invention, it is to be clearly understood that various changes in details and arrangement of parts may be made without departing from the spirit and scope of this disclosure.

We claim:

1. A stove top heating container comprising inner and outer nested container bodies, each of said container bodies being defined by a bottom wall and an upstanding peripheral sidewall in spaced relationship thereby defining a first outer chamber adapted to receive a heat-transfer liquid and a second inner chamber adapted to receive a product, means impermeable to steam closing said second chamber, closure means overlying said inner container body and in part defining with said impermeable means a third chamber, means defining a flow path for steam from the first chamber to the third chamber without entering the second chamber, means for venting steam from said third chamber to atmosphere, annular sealing means between said impermeable means and the entire periphery of said second chamber for preventing ingress of steam from said first to said second chamber, and said flow path defining means is aperture means between said first and third chambers outboard of said sealing means.

2. The stove top heating container as defined in claim 1 wherein said venting means is a single vent opening in said closure means.

3. The stove top heating container as defined in claim 1 wherein said inner container body includes a radially outwardly directed peripheral flange, and said flow path defining means include a vent opening in said peripheral flange.

4. The stove top heating container as defined in claim 3 wherein said impermeable closing means is a lid, and said lid includes a vent opening spaced from but in fluid communication with the vent opening of said peripheral flange.

5. The stove top heating container as defined in claim 1 including curl means for securing said closure means and lid in assembled relationship to said inner and outer container bodies.

6. A stove top heating container comprising inner and outer nested one-piece container bodies, each of said container bodies being defined by a bottom wall, a radially outwardly directed peripheral flange and an upstanding peripheral wall therebetween, said bottom and upstanding peripheral walls being in space relationship thereby defining a first outer chamber adapted to receive a heat-transfer liquid and a second inner chamber adapted to receive a product, said inner container body flange resting atop said outer container body flange and being supported thereby, first closure means impermeable to steam spanning and closing said second chamber, second closure means in spaced overlying relationship to said first closure means and in part defining therewith a third chamber, aperture means in said inner container body peripheral flange and said first closure means defining a flow path for steam from said first chamber to said third chamber without entering the second chamber, means for venting steam from said third chamber to atmosphere, and a portion of the said outer container body peripheral flange being reversely curled upwardly, inwardly and downwardly upon said second closure means, thereby crimpingly securing said first and second closure means and the inner container body peripheral flange between said outer container body peripheral flange and said portion thereof.

7. The stove top heating container as defined in claim 6 including sealing means between said first closure means and said inner container body peripheral flange for preventing ingress of steam from said first to said second chamber, and said flow path defining means is aperture means between said first and third chambers outboard of said sealing means.

8. The stove top heating container as defined in claim 7 wherein a portion of said inner container body peripheral flange is reversely curled upwardly, inwardly and downwardly upon said second closure means, thereby cooperating with said outer container body peripheral flange portion to crimpingly secure said first and second closure means and the inner container body peripheral flange between said inner and outer container body peripheral flanges and said portions thereof.

9. The stove top heating container as defined in claim 8 wherein said first and second said closure means is each formed of a single piece of material.

* * * * *